United States Patent Office 3,014,034
Patented Dec. 19, 1961

3,014,034
1,3-DIARYL, 5-AMINO-PYRIDAZINONES
Jean Druey and Konrad Meier, Riehen, Switzerland, assignors to Ciba Pharmaceutical Products Inc., Summit, N.J.
No Drawing. Filed Jan. 6, 1960, Ser. No. 712
Claims priority, application Switzerland Jan. 22, 1959
13 Claims. (Cl. 260—250)

This invention relates to new aryl-diazines and to a process for their manufacture.

The new aryl-diazines are 1:3-diaryl-5-amino-pyridazone-(6) compounds and their salts. In these new compounds the aryl radicals, which are primarily phenyl radicals, can also contain substituents, such as low alkyl or alkoxy groups, e.g. methoxy, ethoxy, methyl or ethyl, halogen atoms e.g. chlorine or bromine, or nitro or amino groups.

The amino group in 5-position is primarily a mono- or di-substituted amino group. As substituents in this case may be mentioned primarily low aliphatic or cycloaliphatic radicals, such as substituted or unsubstituted, saturated or unsaturated aliphatic or cycloaliphatic hydrocarbon radicals or such radicals interrupted by hetero atoms, such as oxygen, nitrogen or sulfur, the following being examples of these radicals: alkyl, cycloalkyl, hydroxyalkyl, alkylene, oxa-alkylene, aza-alkylene and amino-alkyl radicals (in which the amino group can likewise be substituted as specified), viz. methyl, ethyl, propyl, isopropyl, butyl, isobutyl, pentyl, isopentyl, cyclopentyl, cyclohexyl, hydroxy-, alkoxy-, amino-, di-low alkylamino-, pyrrolidino-, piperidino-, morpholino- or piperazino-ethyl, -propyl or -butyl, butylene-(1:4), pentylene - (1:5), 3 - aza - pentylene - (1:5) and 3 oxapentylene-(1:5).

The amino group is preferably a tertiary amino group, for example a dialkylamino group or an alkylene amino group which may if desired be interrupted in the alkylene chain by nitrogen or oxygen, or a tertiary aminoalkylamino group in which the tertiary amino group is as described above.

The new compounds possess valuable antipyretic and analgetic activity. In addition they increase the resistance of animal organisms as regards bacterial and virus infections and can be used, alone or in conjunction with other medicaments such as sulfonamides, whose activity they are capable of increasing, for prophylaxis or therapy in the case of such infections.

Of especial value are the compounds of the formula

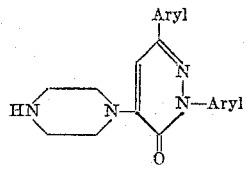

and their salts.

The new compounds are obtained by reacting 1:3-diaryl-5-halogen-pyridazone-(6) compounds with ammonia or with amines containing hydrogen attached to nitrogen.

The reaction is advantageously carried out in the presence of basic condensing agents, if desired with the application of an excess of the ammonia or amine.

The 5-halogen compounds used as starting materials are new. They are obtained in the manner known per se by halogenation of 1:3-diaryl-pyridazinone-(6) compounds which are at most mono-substituted in 4-position and unsubstituted in 5-position, with simultaneous or subsequent oxidation. Advantageously the reaction is carried out with a mixture of phosphorus oxyhalide and phosphorus pentahalide, especially the chlorides, or with elementary halogen advantageously in the presence of oxidising agents or oxidising catalysts, such as ferric salts and the like.

The new 5-halogen compounds likewise form part of the present invention. They possess antipyretic and analgetic properties and so antibacterial and fungistatic properties.

According to the nature of the process used, the new compounds are obtained in the form of the free bases or their salts. From the salts the bases can be obtained in the customary manner; free bases can be converted by known methods into their salts. For the production of therapeutically useful salts are suitable inorganic acids, for example hydrohalic acids, sulfuric acids, nitric acid, phosphoric acids, thiocyanic acid or organic acids, for example acetic acid, propionic acid, oxalic acid, malonic acid, tartaric acid, succinic acid, malic acid, methane sulfonic acid, ethane sulfonic acid, hydroxyethane sulfonic acid, benzene or toluene sulfonic acid or therapeutically active acids.

The new compounds can be used as medicaments, for example in the form of pharmaceutical preparations containing them or their salts in admixture with a pharmaceutical organic or inorganic carrier material suitable for enteral, parenteral or local administration. For the production thereof such substances are concerned as do not react with the new compounds, for example water, gelatines, lactose, starch, magnesium stearate, talc, vegetable oils, benzyl alcohols, gums, polyalkylene glycols, petroleum jelly, cholesterol or other known medicament carriers. The pharmaceutical preparations can be made up for example, as tablets, dragees, salves or creams or in liquid form as solutions, suspensions or emulsions. If desired they are sterilized and/or contain auxiliary substances, such as preserving, stabilizing, wetting or emulsifying agents, salts for variation of the osmotic pressure or buffer substances. They may also contain other therapeutically valuable substances. The preparations are produced by customary methods.

The invention also comprises any modification of the process in which a compound obtainable as an intermediate at any stage of the complete process is used as starting material and the remaining step or steps are carried out.

The following examples illustrate the invention.

*Example 1*

To a solution of 30 grams of piperazine in 300 cc. of ethanol are added 14.13 grams of 1:3-diphenyl-5-chloropyridazone-(6) and the mixture is heated in a tube for 6 hours to 130–140° C. The reaction solution is filtered from a little difficultly soluble by-product and the filtrate evaporated to dryness. The residue is dissolved in 100 cc. of warm N-hydrochloric acid, the solution filtered with charcoal and the filtrate rendered alkaline with 2 N-sodium hydroxide solution with ice cooling. The aqueous mother liquor is decanted from the base deposited as a resin and the latter is dissolved in methylene chloride and the solution washed with water, dried with sodium sulfate and the methylene chloride is distilled off. The residue is recrystallized from acetone. The 1:3-diphenyl-5-piperazino-pyridazone-(6) of the formula

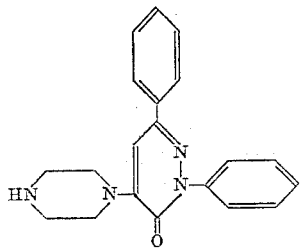

melts at 170–170.5° C; the hydrochloride, prepared in the customary manner, melts at 190–192° C.

The 1:3-diphenyl-5-chloro-pyridazone-(6) used as starting material can be prepared as follows:

89 grams of benzoyl-propionic acid are boiled in 1 liter of benzene with 54 grams of phenyl hydrazine under a reflux condenser with a water separator until no more water is separated. The benzene is distilled off and the resulting 1:3 - diphenyl-pyridazinone - (6) recrystallized from methanol. M.P. 91–93° C.

50 grams of 1:3-diphenyl-pyridazinone-(6) are heated slowly with stirring with 400 cc. of phosphorus oxychloride and 400 grams of phosphorus pentachloride to the boiling point of the phosphorus oxychloride and then boiling continued under reflux for 16 hours. The excess of phosphorus oxychloride is distilled off under vacuum until the residue becomes a syrup still capable of being poured. This syrup is stirred into water with the addition of ice so that the temperature is maintained below 70° C. The precipitated reaction product is extracted with methylene chloride, the methylene chloride solution washed with water, dried with sodium sulfate and evaporated. The residue consists of a mixture of 1:3-diphenyl-pyridazone-(6) and 1:3-diphenyl-5-chloro-pyridazone (6), from which the latter can easily be obtained in pure form as more difficultly soluble substance by recrystallization from acetone. M.P. 186–188° C.

*Example 2*

14.1 grams of 1:3-diphenyl-5-chloro-pyridazone-(6) are boiled under reflux (bath temperature 160° C.) for 12 hours with stirring with 50 cc. of N:N-dimethyl-N'-ethyl-ethylene diamine. The excess of base is then distilled off under vacuum. The residue is dissolved in warm dilute hydrochloric acid, the solution filtered with charcoal and the filtrate rendered alkaline with concentrated ammonia. The base is precipitated as an oil which slowly crystallizes. It is taken up in benzene and the solution washed with water and the solvent distilled off. A brown oil remains which is dissolved in a large quantity of boiling petroleum ether. After filtration with charcoal, the solution is concentrated somewhat and the 1:3-diphenyl-5-[N-(β-dimethyl-amino-ethyl) - N - ethylamino]-pyridazone-(6) of the formula

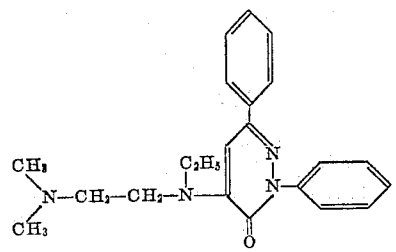

crystallizes in colorless needles of M.P. 74–75° C. Its hydrochloride melts at 240–241° C.

*Example 3*

14.12 grams of 1:3-diphenyl-5-chloro-pyridazone-(6) are boiled under reflux for 12 hours with stirring with 80 cc. of N:N-diethyl-ethylene diamine. The excess base is then distilled off under vacuum, the residue treated with 100 cc. of 2 N-hydrochloric acid and 400 cc. of water and solution produced by heating. The solution is filtered hot with charcoal and the clear filtrate rendered alkaline with ammonia with stirring. The base which deposits in crystals is filtered with suction, washed with water and recrystallized from methanol. The 1:3-diphenyl-5-(β-diethylamino-ethylamino)-pyridazone-(6) of the formula

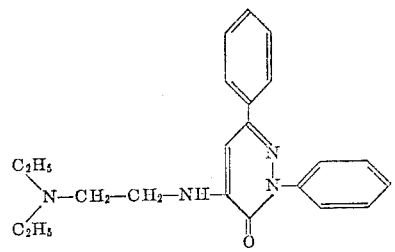

forms colorless leaflets of M.P. 99–99.5° C. Its hydrochloride prepared in the customary manner crystallizes from alcohol in colorless prisms of M.P. 203.5–205° C.

*Example 4*

7.07 grams of 1:3-diphenyl-5-chloro-pyridazone-(6) are heated with 200 cc. of 10% ethanolic dimethylamine solution in a tube for 10 hours to 140–150° C. The alcohol is then distilled off under vacuum, the residue taken up in ether and water and the ethereal phase washed with water, dried with sodium sulfate and evaporated. The residue is crystallized from methanol. 1:3-diphenyl-5-dimethylamino-pyridazone-(6) of the formula

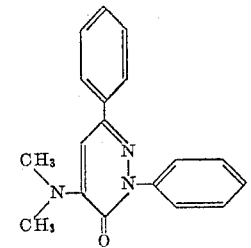

is obtained in colorless prisms of M.P. 119–120° C.

What is claimed is:
1. 1:3-diphenyl-5-piperazino-pyridazone-(6).
2. 1:3-diphenyl-5-[N-(β-dimethylaminoethyl)-N-ethylamino]-pyridazone-(6).
3. 1:3-diphenyl-5-(β-diethylamino-ethylamino)-pyridazone-(6).
4. 1:3-diphenyl-5-dimethylamino-pyridazone-(6).
5. 1:3-diphenyl-5-chloro-pyridazone-(6).
6. A compound selected from the group consisting of those of the formula

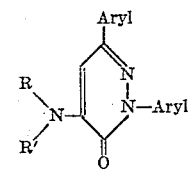

wherein each aryl stands for a member selected from the group consisting of phenyl, lower alkyl-phenyl, lower alkoxy-phenyl, chloro-phenyl, bromo-phenyl, nitro-phenyl and amino-phenyl, and R and R' each stands for a member selected from the group consisting of hydrogen, lower alkyl, cyclopentyl, cyclohexyl, hydroxyl-lower alkyl, lower alkoxy-lower alkyl, amino-lower alkyl, lower alkyl-amino-lower alkyl, di-lower alkyl-amino-lower aklyl, pyrrolidino-lower alkyl, piperidino-lower alkyl, morpholino-lower alkyl, piperazino-lower alkyl and, when taken together, a member selected from the group consisting of butylene(1:4), pentylene(1:5) and 3-oxa-pentylene(1:5), and therapeutically useful acid addition salts thereof.

7. 1:3-diphenyl-5-piperazino-pyridazone-(6), in which at least one of the phenyl radicals carries a halogen atom with an atomic weight between 35 and 80.

8. 1:3-diphenyl-5-piperazino-pyridazone-(6), in which at least one of the phenyl radicals carries a lower alkyl group.

9. 1:3-diphenyl-5-piperazino-pyridazone-(6), in which at least one of the phenyl radicals carries a lower alkoxy group.

10. A compound of the formula

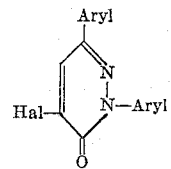

wherein Hal represents a halogen atom with an atomic weight between 35 and 80 and each aryl stands for a member selected from the group consisting of phenyl, lower alkyl-phenyl, lower alkoxy-phenyl, chloro-phenyl, bromo-phenyl, nitro-phenyl and amino-phenyl.

11. Therapeutically useful acid addition salts of the compound of claim 7.

12. Therapeutically useful acid addition salts of the compound of claim 8.

13. Therapeutically useful acid addition salts of the compound of claim 9.

No references cited.